(12) United States Patent
Kanemoto et al.

(10) Patent No.: US 11,805,149 B2
(45) Date of Patent: Oct. 31, 2023

(54) DETERMINATION METHOD, DETERMINATION DEVICE AND RECORDING MEDIUM

(71) Applicant: NIPPON TELEGRAPH AND TELEPHONE CORPORATION, Tokyo (JP)

(72) Inventors: Yo Kanemoto, Musashino (JP); Kazufumi Aoki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 573 days.

(21) Appl. No.: 17/056,904

(22) PCT Filed: Apr. 15, 2019

(86) PCT No.: PCT/JP2019/016222
§ 371 (c)(1),
(2) Date: Nov. 19, 2020

(87) PCT Pub. No.: WO2019/225216
PCT Pub. Date: Nov. 28, 2019

(65) Prior Publication Data
US 2021/0306374 A1 Sep. 30, 2021

(30) Foreign Application Priority Data

May 21, 2018 (JP) ................................ 2018-097418

(51) Int. Cl.
*H04L 9/40* (2022.01)
(52) U.S. Cl.
CPC ...... *H04L 63/1466* (2013.01); *H04L 63/0236* (2013.01); *H04L 63/0263* (2013.01); *H04L 63/1416* (2013.01); *H04L 63/1425* (2013.01)

(58) Field of Classification Search
None
See application file for complete search history.

(56) References Cited

U.S. PATENT DOCUMENTS

2008/0010683 A1\* 1/2008 Baddour ............... G06F 16/951
713/188
2008/0133540 A1\* 6/2008 Hubbard ............. H04L 63/1483
(Continued)

FOREIGN PATENT DOCUMENTS

JP 2017-130911 A 7/2017
JP 2018-22419 A 2/2018

OTHER PUBLICATIONS

Zhong et al., "AVT Lite: Detection Successful Web Attacks Based-on Attack Code Emulation", Proceedings of the Computer Security Symposium 2017, Oct. 23-25, 2017, pp. 1434-1441.

*Primary Examiner* — James R Turchen
(74) *Attorney, Agent, or Firm* — XSENSUS LLP

(57) ABSTRACT

A determination method includes determining an attack type of an attack code included in an attack request on the server, carrying out emulation of an attack by the attack code on the server in accordance with the determined attack type, and in a case of succeeding in an attack on the server as a result of the emulation, extracting a feature appearing in a response from the server, and examining whether a plurality of responses respectively corresponding to a plurality of requests to the server after the attack request each have the extracted feature, and in a case where at least any one of the plurality of responses has the extracted feature, determining that an attack by the attack code has succeeded, by a processor.

7 Claims, 17 Drawing Sheets

(56) References Cited

U.S. PATENT DOCUMENTS

| | | | |
|---|---|---|---|
| 2010/0100962 A1* | 4/2010 | Boren | H04L 63/1441 |
| | | | 726/25 |
| 2011/0099620 A1* | 4/2011 | Stavrou | G06F 21/566 |
| | | | 726/12 |
| 2016/0285897 A1* | 9/2016 | Gantman | G06N 20/00 |
| 2017/0126724 A1* | 5/2017 | Zhong | G06F 21/554 |
| 2017/0228541 A1* | 8/2017 | Takata | H04L 63/145 |
| 2017/0279817 A1* | 9/2017 | Campbell | H04L 43/022 |
| 2017/0374090 A1* | 12/2017 | McGrew | H04L 41/16 |
| 2018/0012021 A1* | 1/2018 | Volkov | G06F 21/566 |
| 2018/0218158 A1 | 8/2018 | Amano et al. | |
| 2018/0295154 A1* | 10/2018 | Crabtree | H04L 63/1433 |
| 2019/0207967 A1* | 7/2019 | Vashisht | H04L 63/1425 |
| 2019/0370462 A1* | 12/2019 | Nurmi | G06F 21/552 |
| 2020/0396258 A1* | 12/2020 | Jeyakumar | H04L 63/1433 |
| 2021/0279332 A1* | 9/2021 | Goldshmidt | G06F 21/566 |
| 2023/0092522 A1* | 3/2023 | Li | H04L 63/1416 |
| | | | 726/22 |

\* cited by examiner

FIG.4

| ATTACK TYPE | SUB ATTACK TYPE | KEYWORDS |
|---|---|---|
| A | | cat, ls, wget, curl, echo, print, exec, php, python, ruby, ⋯ |
| B | PHP | print_r, var_dump, base64_decode, ⋯<br>$_GET, $_POST, ⋯ |
| | Java | java., javax., @ognl.<br>AND SO ON |
| | Perl | ⋯ |
| | ⋯ | ⋯ |
| C | | select, update, insert, drop, ⋯<br>information_schema, @@version, mysql., ⋯ |
| D | | <, >, script, iframe, document., window., onmouse, onclick,<br>alert(, ⋯ |
| E | | ./, ./../, ⋯ |

FIG.5

| NUMBER | TIME POINT | REQUEST | | RESPONSE | RESPONSE EXAMINATION RESULT |
|---|---|---|---|---|---|
| | | SOURCE IP ADDRESS | DETECTION RESULT | ... | |
| 1 | t | A.A.A.A | ATTACK | ... | TRACE NOT COINCIDENT |
| 2 | t+1 | A.A.A.A | NORMAL | ... | TRACE NOT COINCIDENT |
| 3 | t+2 | B.B.B.B | NORMAL | ... | NOT EXAMINATION TARGET |
| 4 | t+3 | A.A.A.A | NORMAL | ... | COINCIDENT WITH ATTACK TRACE OF REQUEST 1 |
| 5 | t+T+1 | A.A.A.A | NORMAL | ... | NOT EXAMINATION TARGET |

FIG.6

| NUMBER | TIME POINT | SOURCE IP ADDRESS | REQUEST | ATTACK TRACE | RESPONSE | EXAMINATION RESULT | DETERMINATION RESULT |
|---|---|---|---|---|---|---|---|
| 1 | 00:00:00 | A.A.A.A | GET /edit.php?id=1&content=X' union select version();-- | 10.0.3-MariaDB | <html><br>Edit successful<br></html> | TRACE NOT COINCIDENT | SUCCESSFUL |
| 2 | 00:00:01 | B.B.B.B | GET /index.php | | <html><br>Top page<br></html> | TRACE NOT COINCIDENT | NONE |
| 3 | 00:00:02 | A.A.A.A | GET /view.php?id=1 | | <html><br>Hello!<br>X 10.0.3-MariaDB<br></html> | TRACE COINCIDENT | NONE |

FIG.8

| NUM-BER | REQUEST | RESPONSE |
|---|---|---|
| 1 | GET/edit.php?id=1&content=X' union select version()-- | \<html\>Edit successful\</html\> |
| 2 | GET/view.php?id=1 | \<html\>\<h1\> X 10.0.3-MariaDB \</h1\>\</html\> |
| 3 | GET/edit.php?id=2&content=\<script\>alert(1);\</script\> | \<html\>Edit successful\</html\> |
| 4 | GET/view.php?id=2 | \<html\>\<h1\>\<script\>alert(1);\</script\>\</h1\>\</html\> |

FIG.9

| NUM-BER | REQUEST | RESPONSE |
|---|---|---|
| 1 | GET/index.php?file=home;cat/etc/passwd > /var/www/secretfile | \<html\>\<h1\>Helloworld\</h1\>\</html\> |
| 2 | GET /secretfile | root:x:0:0:root:/root:/bin/bash bin:x:1:1:bin:/bin:/sbin/nologin |

FIG.10

| NUM-BER | REQUEST | RESPONSE |
|---|---|---|
| 1 | POST /upload.php<br>...<br><?php system("cat /etc/passwd") | <html><br><h1>Upload successful</h1><br></html> |
| 2 | GET /uploadfile/exploit.jpg.php | root:x:0:0:root:/root:/bin/bash<br>bin:x:1:1:bin:/bin:/sbin/nologin |

FIG.12

| NUM-BER | REQUEST | RESPONSE |
|---|---|---|
| 1 | GET /edit.php?id=1&content=1234abcd | <html>Edit successful</html> |
| 2 | GET /view.php?id=1 | <html><h1>1234abcd</h1></html> |
| 3 | GET /edit.php?id=2&content=5678wxyz | <html>Edit successful</html> |
| 4 | GET /view.php?id=2 | <html><h1>5678wxyz</h1></html> |
| 5 | GET /index.php | <html>Helloworld</html> |

FIG.13

| INPUT URL | OUTPUT URL |
|---|---|
| /edit.php | /view.php |
| ... | ... |

FIG. 14

| NUM-BER | TIME POINT | SOURCE IP ADDRESS | REQUEST | ATTACK TRACE | RESPONSE | EXAMINA-TION TARGET | EXAMINA-TION RESULT | DETERMI-NATION RESULT |
|---|---|---|---|---|---|---|---|---|
| 1 | 00:00:00 | A.A.A.A | GET /edit.php?id=1&content=X' union select version();-- | 10.0.3-MariaDB | \<html\><br>Edit successful<br>\</html\> | TARGET | TRACE NOT COINCIDENT | SUCCESS-FUL |
| 2 | 00:00:01 | B.B.B.B | GET /index.php | | \<html\><br>Top page<br>\</html\> | NOT TARGET | TRACE NOT COINCIDENT | NONE |
| 3 | 00:00:02 | B.B.B.B | GET /view.php?id=1 | | \<html\><br>Hello!<br>X 10.0.3-MariaDB<br>\</html\> | TARGET | TRACE COINCIDENT | NONE |

FIG.17

| NUM-BER | TIME POINT | SOURCE IP ADDRESS | REQUEST | ATTACK TRACE | FILE NAME RULE TABLE | RESPONSE | EXAMINATION TARGET | EXAMINATION RESULT | DETERMINATION RESULT |
|---|---|---|---|---|---|---|---|---|---|
| 1 | 00:00:00 | A.A.A.A | GET /index.php?file =;cat etc/passwd > /var/www/secret | root: | /secret | <html></html> | TARGET | TRACE NOT COINCIDENT | SUCCESSFUL |
| 2 | 00:00:01 | B.B.B.B | GET /index.php | | /secret | <html>Toppage</html> | NOT TARGET | TRACE NOT COINCIDENT | NONE |
| 3 | 00:00:02 | B.B.B.B | GET /secret | | /secret | root:x:0:0:root: /root:/bin/bash | TARGET | TRACE COINCIDENT | NONE |

FIG.18
(a)
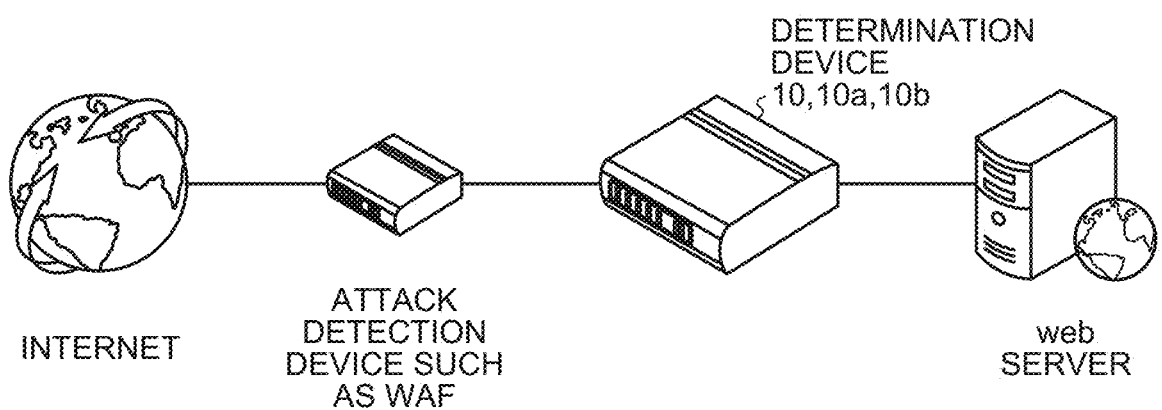
(b)
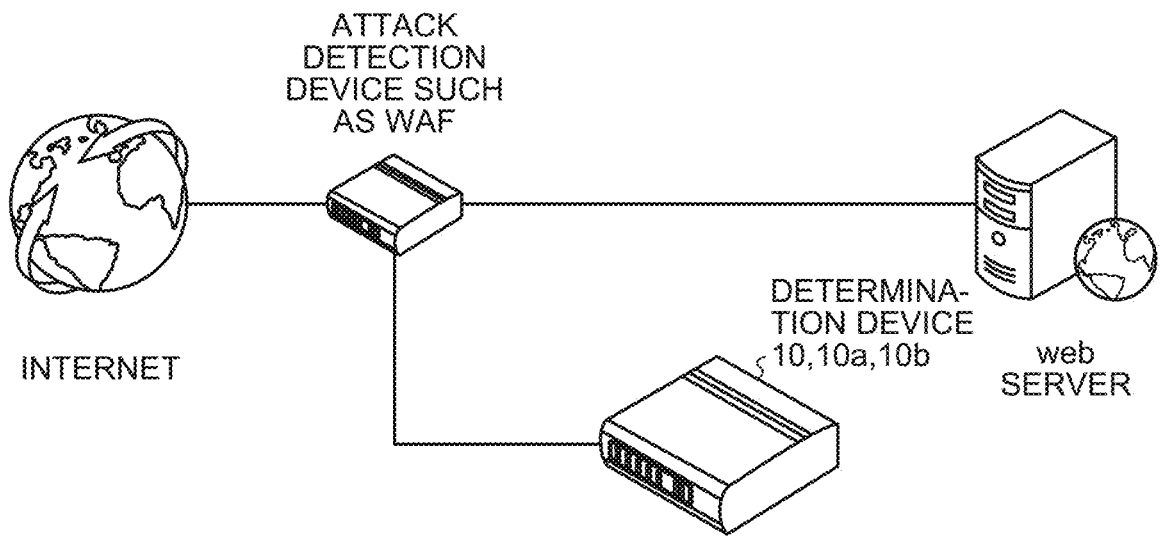

DETERMINATION METHOD, DETERMINATION DEVICE AND RECORDING MEDIUM

CROSS-REFERENCE TO RELATED APPLICATIONS

The present application is based on PCT filing PCT/JP2019/016222, filed Apr. 15, 2019, which claims priority to JP 2018-097418, filed May 21, 2018, the entire contents of each are incorporated herein by reference.

TECHNICAL FIELD

The present invention relates to a determination method, a determination device, and a recording medium.

BACKGROUND ART

Web applications are used in many services, meanwhile they are vulnerable to attacks because they are accessible by many and unspecified people. Attacks can be detected by web application firewalls (WAF), network-based intrusion detection systems (NIDS), and the like, but it is requested to investigate and verify a large number of alerts to determine whether or not the attack has succeeded. Therefore, for example, in order to determine whether or not an attack has succeeded, there is a technique devised, in which a response corresponding to an attack request is examined, and if there is a feature that appears when the attack has succeeded, it is determined that the attack has succeeded, and if there is not a feature that appears when the attack has succeeded, it is determined that the attack has failed (e.g., see Non Patent Literature 1).

CITATION LIST

Non Patent Literature

Non Patent Literature 1: Yang ZHONG, Kazufumi AOKI, Jun MIYOSHI, Hajime SHIMADA, and Hiroki TAKAKURA, "AVT Lite: Detection Successful Web Attacks Based-on Attack Code Emulation" Proceedings of the Computer Security Symposium 2017, 2017

SUMMARY OF THE INVENTION

Technical Problem

However, the conventional technique described above sets, as an examination target, the response corresponding to an attack request, and hence there is a problem that if a trace (feature) of attack appears in a response different from the response corresponding to the attack request, the success or failure of the attack may not be appropriately determined.

The present invention has been made in view of the above, and its object is to facilitate appropriate determination as to success or failure of an attack even if a trace of the attack appears in a response different from the response corresponding to the attack request.

Means for Solving the Problem

In order to solve the above problem and achieve a goal, a determination method includes: determining an attack type of an attack code included in an attack request on a server; carrying out emulation of an attack by the attack code on the server in accordance with the determined attack type, and in a case of succeeding in an attack on the server as a result of the emulation, extracting a feature appearing in a response from the server; and examining whether a plurality of responses respectively corresponding to a plurality of requests to the server after the attack request each have the extracted feature, and in a case where at least any one of the plurality of responses has the extracted feature, determining that an attack by the attack code has succeeded, by a processor.

A determination device includes: a memory; and processing circuitry coupled to the memory and configured to: determine an attack type of an attack code included in an attack request on a server, carry out emulation of an attack by the attack code on the server in accordance with the determined attack type, and in a case of succeeding in an attack on the server as a result of the emulation, extract a feature appearing in a response from the server, and examine whether a plurality of responses respectively corresponding to a plurality of requests to the server after the attack request each have the extracted feature, and in a case where at least any one of the plurality of responses has the extracted feature, determine that an attack by the attack code has succeeded.

A non-transitory computer-readable recording medium stores therein a determination program that causes a computer to execute a process including: determining an attack type of an attack code included in an attack request on a server, carrying out emulation of an attack by the attack code on the server in accordance with the determined attack type, and in a case of succeeding in an attack on the server as a result of the emulation, extracting a feature appearing in a response from the server, and examining whether a plurality of responses respectively corresponding to a plurality of requests to the server after the attack request each have the extracted feature, and in a case where at least any one of the plurality of responses has the extracted feature, determining that an attack by the attack code has succeeded.

Effects of Invention

The present invention achieves an effect of being capable of appropriately determining success or failure of an attack even if a trace of the attack appears in a response different from the response corresponding to the attack request.

BRIEF DESCRIPTION OF DRAWINGS

FIG. 4 is a view illustrating an example of a keyword list by attack type of FIG. 3.

FIG. 5 is a view explaining processing of the determination device of FIG. 3 determining success or failure of an attack.

FIG. 6 is a view explaining processing of the determination device of FIG. 3 determining success or failure of an attack.

FIG. 8 is a view explaining an effect of the determination device of the first embodiment.

FIG. 9 is a view explaining the effect of the determination device of the first embodiment.

FIG. 10 is a view explaining the effect of the determination device of the first embodiment.

FIG. 12 is a view explaining processing of creating an input/output URL rule by the determination device of the second embodiment.

FIG. 13 is a view explaining processing of creating the input/output URL rule by the determination device of the second embodiment.

FIG. 14 is a view explaining processing by the determination device of the second embodiment determining success or failure of an attack.

FIG. 17 is a view explaining processing by the determination device of the third embodiment determining success or failure of an attack.

FIG. 18 is a view illustrating a configuration example of a network including the determination device of each embodiment.

DESCRIPTION OF EMBODIMENTS

Embodiments of the present invention will be explained below with reference to the drawings. The present invention is not limited to the present embodiments.

First Embodiment

[Outline]

Figure 1:
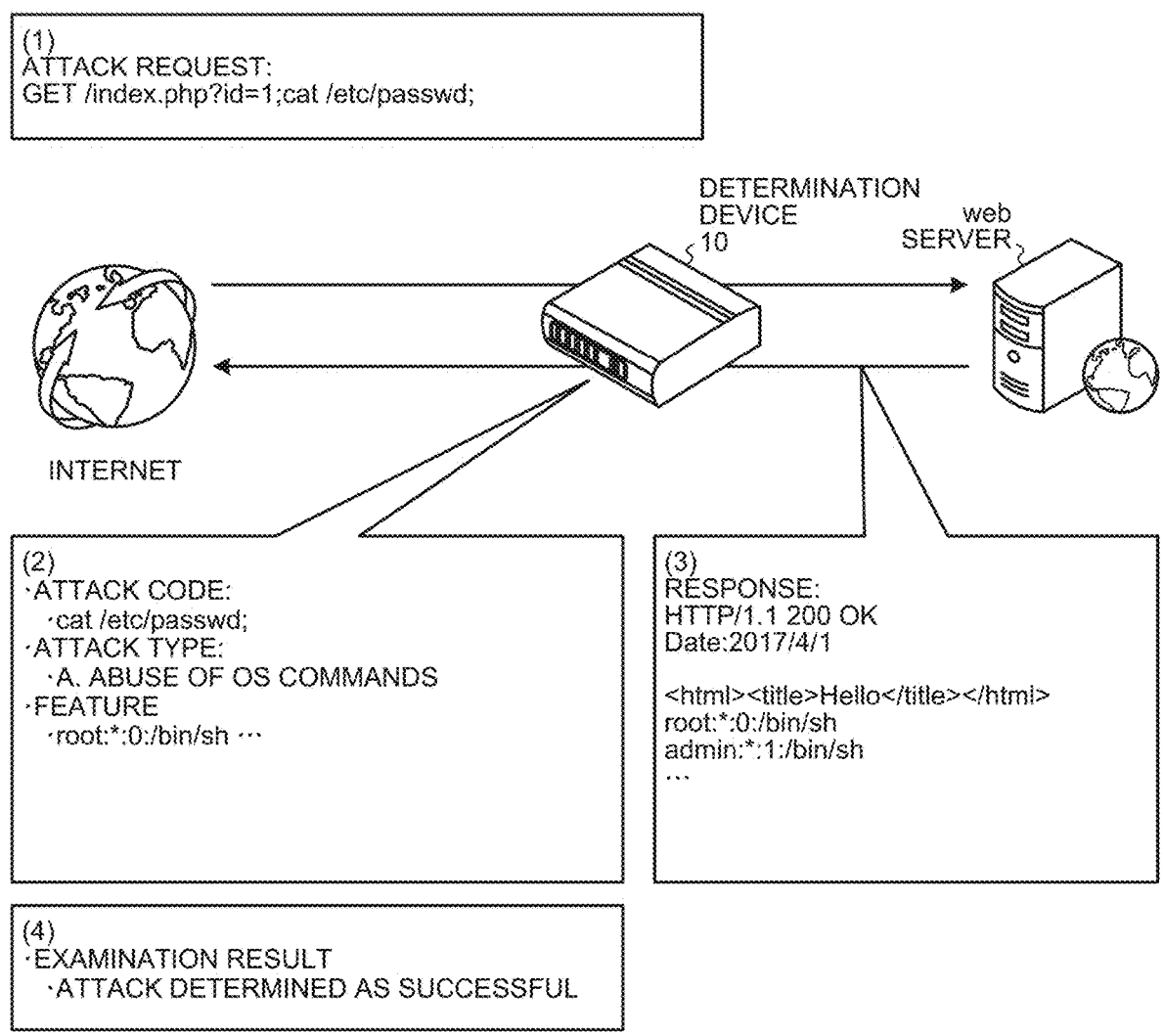
FIG. 1 is a view explaining an operation outline of a determination device of a first embodiment.
Figure 2:
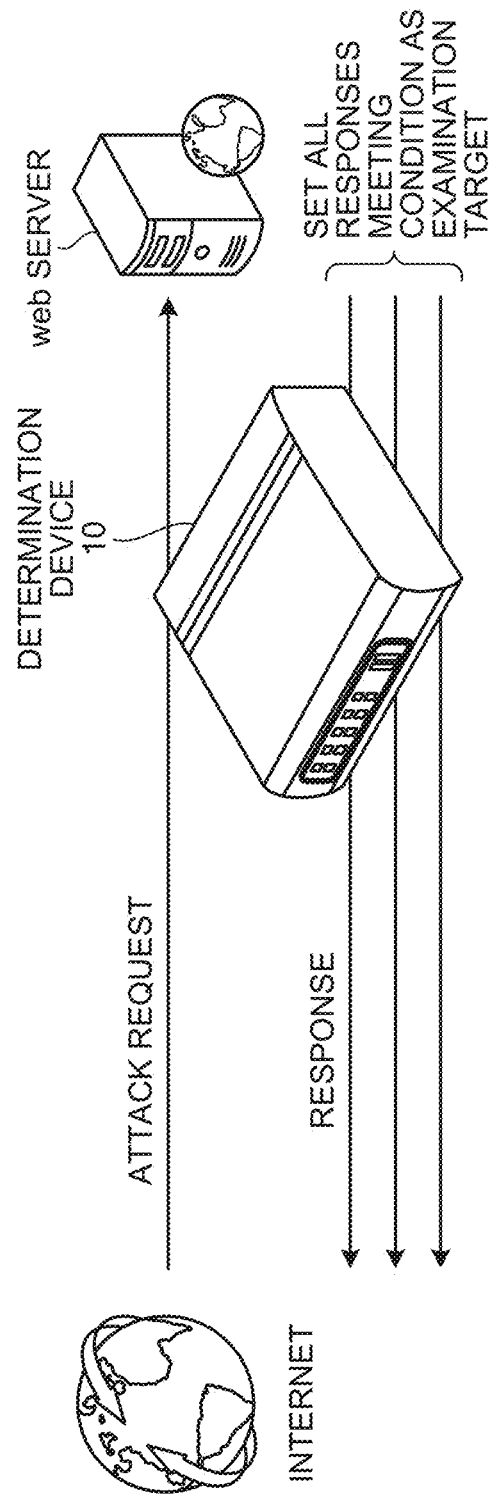
FIG. 2 is a view explaining the operation outline of the determination device of the first embodiment.

An operation outline of a determination device 10 of the first embodiment will be explained with reference to FIGS. 1 and 2. First, as illustrated in FIG. 1, for example, upon receiving an attack request (1) to a web application (web server), the determination device 10 identifies an attack code and an attack type included in the attack request. Then, the determination device 10 executes the attack code with an emulator corresponding to the identified attack type (e.g., an attack type abusing operating system (OS) commands), and extracts information to be output from the web server as a result of the execution as a feature (e.g., "root:*:0:/bin/sh . . . ") to be output at the time of success of the attack (2).

Thereafter, the determination device 10 examines a response (3) from the web server, and if the response includes the feature (e.g., "root:*:0:/bin/sh") extracted in (2), it determines that the attack is successful ((4) examination result: attack is successful). Here, as illustrated in FIG. 2, when an attack request was made, the determination device 10 of the first embodiment determines whether or not the extracted feature is included, with not only the response to the attack request but also all subsequent responses that meet a predetermined condition as an examination target, and if the extracted feature is included, the determination device 10 determines that the attack is successful.

By doing this, when an attack request was made, the determination device 10 can determine the success or failure of the attack spanning a plurality of requests by using the extracted trace to examine on not only the response to the request but also the subsequent responses. As a result, the determination device 10 can appropriately determine the success or failure of an attack spanning a plurality of requests without modifying the existing system.

[Configuration]

Next, the configuration of the determination device 10 will be explained with reference to FIG. 3. The determination device 10 includes a storage unit 11, an attack detection unit 121, an attack type determination unit 122, an attack code analysis unit (feature extraction unit) 123, a feature selection unit 124, and a success/failure determination unit 125.

A keyword list 111 by attack type is information indicating keywords included in the attack code of the attack type for each attack type. The keyword list 111 by attack type is referred to when the attack type determination unit 122 determines the attack type from the keyword included in the attack code.

It is to be noted that the attack type is divided into five types of, for example, A. attack type abusing OS commands, B. attack type abusing program codes, C. attack type abusing SQL commands (DB function) (e.g., SQL injection and so on), D. attack type abusing HTTP responses (e.g., XSS, header injection, and so on), and E. attack type abusing file operations (e.g., directory traversal and so on).

It is to be noted that as illustrated in FIG. 4, in the attack type A., the name of the OS command is used as a keyword. In the attack type B., a unique expression used in the programming language is used as a keyword. For example, in the case of PHP, functions unique to PHP such as print_r, var_dump, and base64_decode, or unique expressions of PHP ($_GET, $_POST, and so on) are used as a keyword. The same applies to other programming languages (Java (registered trademark), Perl, Ruby, Python, and so on). Therefore, in the attack type B., a keyword list by attack type is held for each programming language. At this time, information on which programming language corresponds is held as a sub attack type, as illustrated in FIG. 4, for example.

In the attack type C., the name of SQL commands (select, update, insert, drop, and so on) or a characteristic expression for DB access are used as a keyword. For example, in the case of MySQL, they include information schema, @@version, and mysql. Furthermore, in the attack type D., unique expressions (alert, onclick, and so on) used in HTML and Javascript (registered trademark) are used as a keyword. In addition, in the attack type E., unique expressions (../ and so on) used in the directory traversal attack are used as a keyword.

Figure 3:
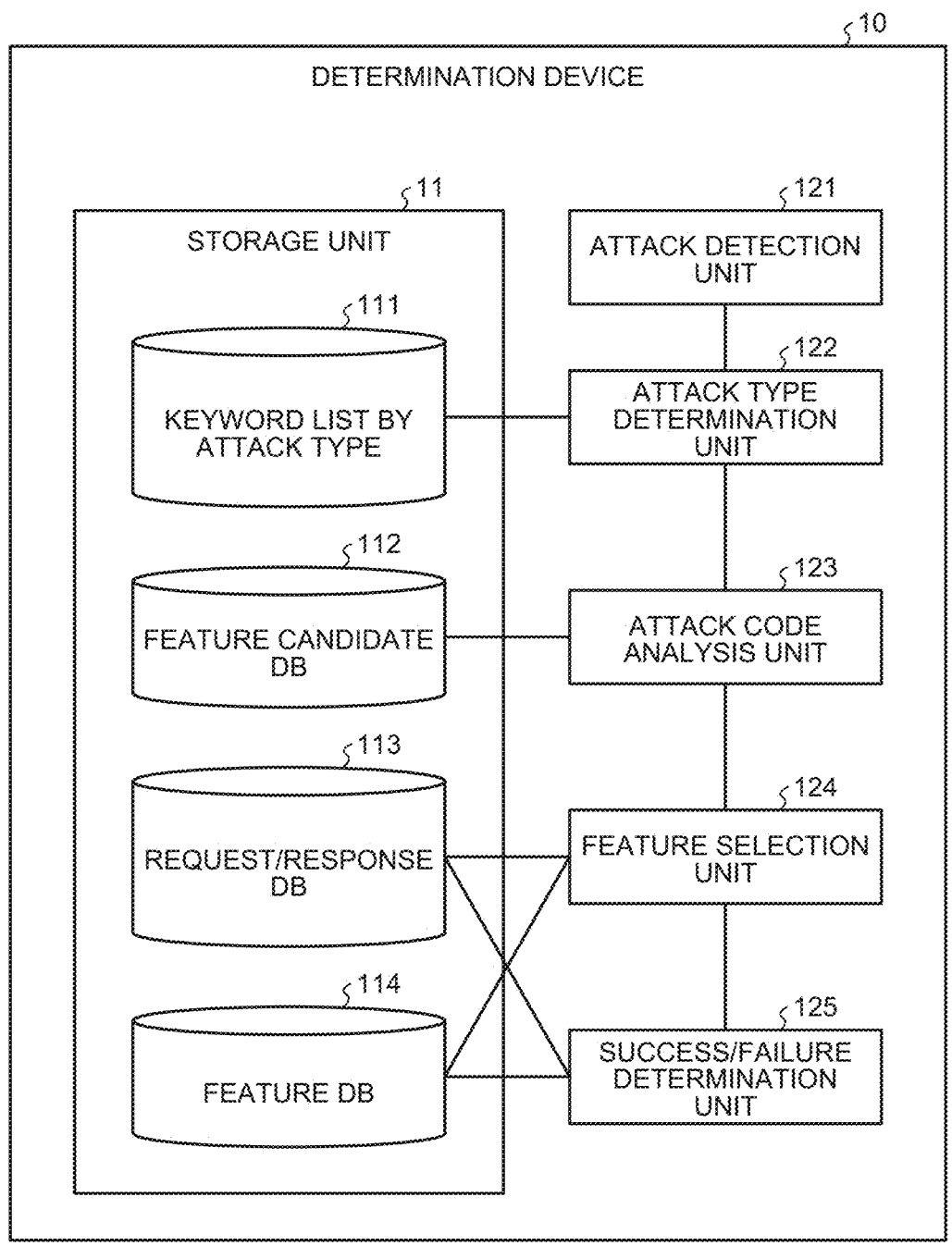
FIG. 3 is a view illustrating a configuration example of the determination device of FIG. 1.

The explanation of FIG. 3 resumes now. A feature candidate DB 112 stores information (feature candidate) having been output from the web server as a result of emulation of the attack code by the attack code analysis unit 123.

A request/response DB 113 stores various requests to web applications (web servers) and various responses from web applications (web servers). It is to be noted that the request/response DB 113 may also store information to be referred to when the feature selection unit 124 excludes words (universal words) frequently appearing in the normal response from the feature candidates. In this case, the request/response DB 113 is created by acquiring a response in a test environment where no attack is guaranteed to come, for example. Alternatively, the request/response DB 113 is created by using a response corresponding to a request not detected by the attack detection unit 121.

A feature DB 114 stores features to be output from the web server at the time of a successful attack by the attack code. Specifically, the feature DB 114 stores the feature selected by the feature selection unit 124 from among the feature candidates stored in the feature candidate DB 112. The feature stored in the feature DB 114 is referred to when the success/failure determination unit 125 determines whether or not the attack has succeeded on the basis of the response from the web server.

The attack detection unit 121 performs determination (attack detection) as to whether or not a request to the web server is an attack. As the attack detection algorithm, existing signature detection algorithms (e.g., Snort (https://www.snort.org/) and Bro (https://www.bro.org/)) or abnormality detection algorithms (e.g., Detecting Malicious Inputs of Web Application Parameters Using Character Class Sequences, COMPSAC, 2015) may be used.

It is to be noted that here, the URL encode and the HTML encode in the request to be processed by the attack detection unit 121 are assumed to have been decoded. For example, if the request is "GET/index.php?id=1234%3Bcat%20%2Fetc%2Fpasswd%3B", it is assumed to have been decoded to "GET/index.php?id=1234;cat/etc/passwd;".

The part of the attack code in the request is to be output by the above-mentioned existing signature detection algorithm or the above-mentioned abnormality detection algorithm. For example, if the request is "GET/index.php?id=1234;cat/etc/passwd;", it is assumed that "1234;cat/etc/passwd;", which is the part of the attack code of the request, is output by the algorithm.

The attack type determination unit 122 performs determination on the attack type to the attack code included in the request that the attack detection unit 121 has determined as an attack.

Here, the attack type determination unit 122 determines as to which of the five attack types (attack types of A. to E. described above) considered to be particularly important among attacks against the web application, for example. The determination of the attack type here is performed on the basis of which of the attack types presented in the keyword list 111 by attack type (See FIG. 4) a keyword included in the attack code matches.

For example, the attack type determination unit 122 refers to the keyword list 111 by attack type, and if "cat" is included in the attack code, the attack type determination unit 122 determines that the attack code is the attack type A. (attack type abusing OS commands). If "print_r" is included in the attack code, the attack type determination unit 122 determines that the attack code is the attack type B. (attack type abusing program codes), among which it is the attack type using php.

It is to be noted that if the attack code matches keywords of a plurality of attack types presented in the keyword list 111 by attack type (See FIG. 4), the attack type determination unit 122 determines that the attack code is the attack type of the keyword appearing at the beginning (leftmost position in the attack code) of the attack code, for example.

As an example, if the attack code is ";php-e "$i=123456789;var_dump($1)";", "php", which is a keyword of the attack type A., and "var_dump", which is a keyword of the attack type B., appear in the keyword list 111 by attack type. In such a case, the attack type determination unit 122 determines that the attack type is A. because "php" appears earlier in the attack code described above than "var_dump" does.

It is to be noted that the attack type determination unit 122 refers to the keyword list 111 by attack type, and if the attack code does not match any of the attack types, the attack type determination unit 122 is impossible to determine.

By performing a dynamic analysis using an emulator with respect to the attack code, the attack code analysis unit 123 extracts a feature (output) appearing in the response from the web server when the attack code is executed.

Specifically, using an emulator corresponding to the attack type of the attack code determined by the attack type determination unit 122, the attack code analysis unit 123 carries out emulation of the attack to the web application by the attack code. Then, the attack code analysis unit 123 extracts, as a feature candidate appearing at the time of successful attack, an output appearing in the response to the attack in the emulation of the attack code.

It is to be noted that the emulator corresponding to each of the attack types is created in advance by applying, for example, a debugger or an interpreter, and the attack code analysis unit 123 selects the emulator corresponding to the attack type from the emulators created in advance.

The attack code analysis unit 123 extracts a feature (output) appearing in the response to the request when the attack code is executed as follows, for example.

For example, if the attack type of the attack code is A. attack type abusing OS commands, the attack code analysis unit 123 executes the attack code as a command using an environment where the OS command can be executed (e.g., a Windows (registered trademark) command prompt, Linux (registered trademark) bash, or an emulator that can emulate the command).

As an example, the attack code analysis unit 123 causes the bash command to execute a command designated by the -c argument, such as "bash -c "cat/etc/passwd;"". Then, the attack code analysis unit 123 extracts, as feature candidates, the contents of standard output and standard error output by execution of the command. For example, the attack code analysis unit 123 extracts, as feature candidates, information that the standard output: "root:*:0:/bin/sh . . . " and the standard error output "None" with respect to the attack code "cat/etc/passwd;".

For example, if the attack type of the attack code is B. attack type abusing program codes, the attack code analysis unit 123 executes the attack code using an appropriate interpreter or emulator with respect to the programming language.

As an example, if the attack code is a php code, the attack code analysis unit 123 causes the php interpreter to execute the code designated by the -r argument, such as "php -r "print('123456789');die( );"". If the attack code is a python code, the attack code analysis unit 123 causes the python interpreter to execute the code designated by the -c argument, such as "python -c "import sys;print 123456789; sys.exit( )"".

Then, after executing the code, the attack code analysis unit 123 extracts the contents of the standard output and the standard error output as feature candidates. For example, in the case of the php code, information that the standard output "123456789" and the standard error output "None" is extracted as feature candidates with respect to the attack code "print('123456789');die( );".

If the attack type of the attack code is C. attack type abusing SQL commands (DB function) (e.g., SQL Injection and so on), the attack code analysis unit 123 executes the attack code using a terminal or an emulator that can execute SQL statements with respect to the DB.

It is to be noted that the SQL statement (SQL command) inserted by the SQL Injection attack is partial and cannot be executed as it is. Therefore, the attack code analysis unit 123 performs formatting of the SQL statement. For example, by erasing the portion of the SQL statement preceding the SELECT clause and the like, the attack code analysis unit 123 changes the SQL statement so that the SELECT clause and the like appears at the beginning of the attack code. It is to be noted that the keyword adjusted by the attack code analysis unit 123 so as to appear at the beginning among the clauses of the SQL statement may be a clause other than the SELECT clause (clauses such as update, delete, and drop), and these clauses are assumed to be given in the keyword list 111 by attack type (See FIG. 4).

The attack code analysis unit 123 extracts, as feature candidates, the contents of the standard output and the standard error output by execution of the formatted SQL statement. For example, the attack code analysis unit 123 formats the attack code "'union select 123456789 -" into "select 123456789". Then, the attack code analysis unit 123 extracts, as feature candidates, information that the standard output "123456789" and the standard error output "None" by execution of the formatted attack code.

If the attack type of the attack code is D. attack type abusing HTTP responses (e.g., XSS, Header Injection, and so on), the attack code analysis unit 123 extracts the attack code itself as a feature candidate because the attack code itself is sent to the client as a response due to the nature of the attack.

For example, if the attack code is the attack code "<script>alert(1)</script>" by XSS, the attack code analysis unit 123 extracts "<script>alert(1)</script>" as a feature candidate. If the attack code is the attack code "YrYnSet-Cookie:1234;" by Header Injection, the attack code analysis unit 123 extracts "YrYnSet-Cookie:1234;" as a feature candidate.

If the attack type of the attack code is E. attack type abusing file operations (e.g., directory traversal and so on), the attack code analysis unit 123 searches the OS for a file name appearing in the attack code, and extracts the content of the file with that file name as a feature candidate.

For example, if the attack code is "../../../../etc/passwd", the attack code analysis unit 123 extracts, as a feature candidate, "root:*:0:/bin/sh . . . ", which is the content of the file with the file name appearing in the attack code, retrieved from the OS.

By doing this, the attack code analysis unit 123 can execute emulation corresponding to the attack type of the attack code, and extract the feature (feature candidate) at the time of successful attack by the attack code. It is to be noted that the feature candidates extracted by the attack code analysis unit 123 are stored in the feature candidate DB 112.

The feature selection unit 124 excludes candidates inappropriate as a feature from among the feature candidates extracted by the attack code analysis unit 123. Specifically, the feature selection unit 124 excludes, from among the feature candidates stored in the feature candidate DB 112, feature candidates that are highly likely to be too universal to be used for determination on the success or failure of the attack.

For example, among the feature candidates stored in the feature candidate DB 112, the feature selection unit 124 excludes the feature candidates whose character string length are very short (e.g., the character string length is equal to or less than 2), then excludes the feature candidates of universal words appearing also in normal responses, and stores, in the feature DB 114, the remaining feature candidates as features at the time of successful attack.

For example, from among the feature candidates "1, 2, title, page, 123456789", the feature selection unit 124 excludes the feature candidates "1, 2" whose character string length are equal to or less than a predetermined value (e.g., 2). Thereafter, the feature selection unit 124 excludes universal words from "title, page, 123456789", in which the feature candidates whose character string length are equal to or less than the predetermined value (e.g., 2) have been excluded.

The universal words here are assumed to be, for example, words included in a response to a request that is not an attack. Accordingly, from the feature candidates "title, page, 123456789", with reference to the request/response DB 113, the feature selection unit 124 excludes the feature candidates whose appearance frequency in the request/response DB 113 is equal to or greater than 1. Then, as features at the time of successful attack, the feature selection unit 124 stores, into the feature DB 114, the feature candidates remaining as the result of exclusion.

An example is given. Here, it is assumed a case where the response "<html><title>My blog page</title><p>Hello world! Date:2017/4/1</p></html>" is stored in the request/response DB 113. In this case, the feature selection unit 124 excludes the feature candidates "title, page" appearing in the response from among the feature candidates "title, page, 123456789". Then, as the features at the time of successful attack, the feature selection unit 124 stores, into the feature DB 114, the feature candidate "123456789" remaining as the result of exclusion.

By doing this, the feature selection unit 124 uses the request/response DB 113 when excluding universal words from the feature candidate DB 112, but the feature selection unit 124 may use a list of universal words prepared in advance.

In addition, with respect to the feature candidates extracted by the attack code analysis unit 123, the feature selection unit 124 may perform both exclusion of feature candidates whose character string length are very short and exclusion of feature candidates of universal words as described above, or may perform only either one of them.

The success/failure determination unit 125 examines whether a plurality of responses respectively corresponding to a plurality of requests to the web server after the attack request each have the extracted feature, and if at least any one of the plurality of responses has the extracted feature, the success/failure determination unit 125 determines that the attack by the attack code has succeeded. On the other hand, if the response does not include the feature stored in the feature DB 114, the success/failure determination unit 125 determines that the attack has failed. Then, the success/failure determination unit 125 outputs a determination result of success/failure of the attack.

That is, the success/failure determination unit 125 acquires, from the feature DB 114, the trace (feature) successfully extracted from the attack request, and examines the presence/absence of the trace in the response, thereby determining the success/failure of the attack.

For example, the success/failure determination unit 125 examines whether a plurality of responses respectively corresponding to a plurality of requests transmitted to the web server within a predetermined threshold amount of time T from the attack request each have the extracted feature, and if at least any one of the plurality of responses has the extracted feature, the success/failure determination unit 125 determines that the attack by the attack code has succeeded. Specifically, when an attack request was made, the success/failure determination unit 125 examines an attack trace of the attack request with respect to not only the response to the attack request but also all the responses having the same source IP address as that of the attack request within the predetermined threshold amount of time T. It is to be noted that besides the time condition, the success/failure determination unit 125 may examine an attack trace with respect to all the responses having the same source IP address as that of the attack request until the number of requests or the number of traces held in the feature DB 114 reaches a threshold value.

Here, the processing of determining the success or failure of an attack will be explained with reference to the examples of FIGS. 5 and 6. FIG. 5 and FIG. 6 are views explaining processing of the determination device of FIG. 3 determining success or failure of an attack. The example of FIG. 5 represents which response to be an examination target when a request 1 is determined as an attack and an attack trace is extracted. In this example, the responses to be an examination target are 1, 2, and 4. A response 3 is not an examination target because it has a source IP address different from that of the attack request, and a response 5 is not an examination target because equal to or greater than the amount of time T has elapsed since the request 1. The reason for setting the limitation by the source IP address in this manner is to improve the processing performance by reducing the number of candidates of responses to be verified as much as possible.

In addition, FIG. 6 illustrates an example in which the attack is determined to have succeeded because the attack by the request 1 coincides with the attack trace in the response 3. That is, when the attack request 1 is present, the success/failure determination unit 125 can determine the success/failure of the attack spanning a plurality of requests by examining the extracted trace with respect to not only the response 1 to the request 1 but also the subsequent response 3.

[Processing Procedure]

Figure 7:
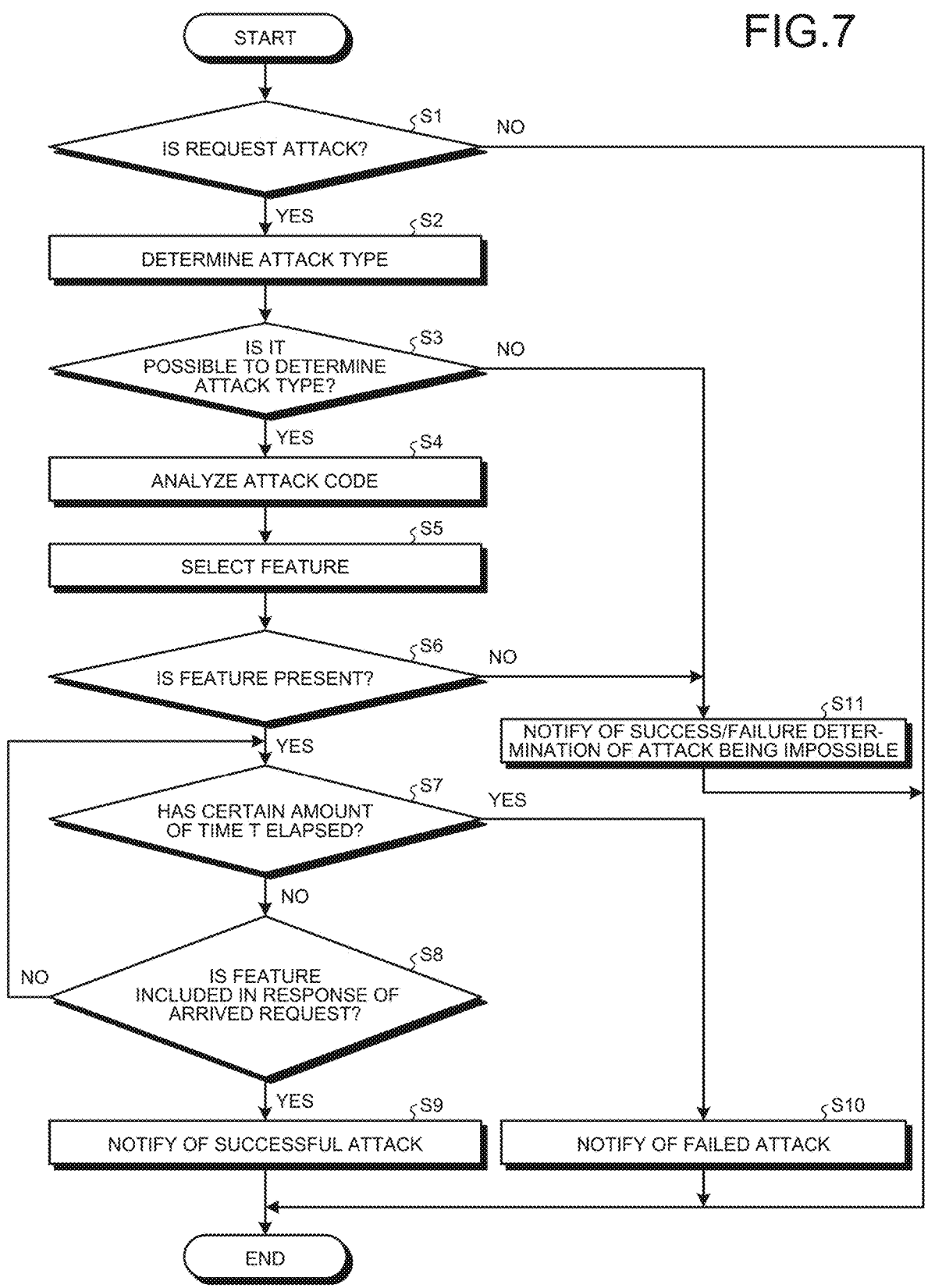
FIG. 7 is a flowchart illustrating a processing procedure of the determination device of FIG. 3.

Next, the processing procedure of the determination device 10 will be explained with reference to FIG. 7. First, the attack detection unit 121 of the determination device 10 determines whether or not the request to the web application is an attack (S1). Here, if the request is an attack (Yes in S1), the attack type determination unit 122 determines, with reference to the keyword list 111 by attack type, the attack type of the attack code included in the request (S2). If the attack type determination unit 122 can determine the attack type (Yes in S3), the attack code analysis unit 123 executes emulation of the attack code on the basis of the determined attack type, and performs attack code analysis processing of extracting, as feature candidates at the time of successful attack, the information having been output as a result of execution (S4). It is to be noted that if the attack detection unit 121 determines in S1 that the request to the web application is not an attack (No in S1), the process ends.

After S4, as a feature to be used for determination on the success or failure of an attack, the feature selection unit 124 selects, from the feature candidates extracted in S4, a feature candidate from which feature candidates inappropriate as a feature (e.g., universal words) are excluded (S5). The features used for determination on the success or failure of the attack are stored in the feature DB 114, for example.

If a feature exists in the feature DB 114 after S5 (Yes in S6), the success/failure determination unit 125 determines whether or not the certain amount of time T has elapsed since the attack request was made (S7). As a result, if the certain amount of time T has elapsed since the attack request was made (Yes in S7), the success/failure determination unit 125 notifies an external device or the like of the failed attack (S10). If the certain amount of time T has not elapsed since the attack request was made (No in S7), the success/failure determination unit 125 determines whether the feature stored in the feature DB 114 is included in the response of the arrived request (S8). For example, the success/failure determination unit 125 collates the feature stored in the feature DB 114 with the response from the web application that becomes the determination target of the success or failure of the attack, thereby determining whether or not the attack has succeeded.

If in the feature examination in S8, the success/failure determination unit 125 determines that the feature stored in the feature DB 114 is included in the response of the arrived request (Yes in S8), the success/failure determination unit 125 notifies the external device or the like of the successful attack (S9). If the success/failure determination unit 125 determines that the feature stored in the feature DB 114 is not included in the response of the arrived request (No in S8), the process returns to S7 and the above process is repeated. That is, if the feature stored in the feature DB 114 is included in the response within the certain amount of time T since the attack request was made, the success/failure determination unit 125 determines that the attack on the web application has succeeded.

It is to be noted that if the attack type determination unit 122 is incapable of determining the attack type in S3 (No in S3), or if it is determined in S6 that no feature exists in the feature DB 114 (No in S6), the determination device 10 notifies the external device or the like of the success/failure determination of the attack being impossible (S11).

[Effects of First Embodiment]

Such the determination device 10 achieves the effect of being capable of appropriately determining success or failure of an attack even if a trace of the attack appears in the response different from the response corresponding to the attack request.

Typical attacks spanning a plurality of requests where a trace of an attack appears in a response different from the response corresponding to the attack request include Second order SQL injection, Stored XSS, Blind command injection, and Command execution via File Upload. The effects of the determination device 10 of the first embodiment will now be explained with reference to the specific examples of FIGS. 8 to 10. FIGS. 8 to 10 are views explaining the effect of the determination device of the first embodiment.

First, the effect of the determination device of the first embodiment on attacks such as Second order SQL injection and Stored XSS will be explained with reference to FIG. 8. For example, it is assumed that a URL (/edit.php) for editing an article in a blog application and a URL (/view.php) for browsing the article exist. In addition, the specifications are assumed such that an article ID is specified as follows and the article is edited or browsed.

Edit: GET/edit.php?id=1&content=My first post
Browse: GET/view.php?id=1

If the sanitizing processing of the content parameter is vulnerable, and SQL injection or XSS is vulnerable, an attack can be made as in the request (1) and the request (3) illustrated in FIG. 8. Due to the specifications of the application, the attack code "union select version( )--" or "<script>alert(1);</script>" is executed not when the article is edited but when the article is browsed, and hence a trace of the successful attack does not appear when/edit.php is accessed and the trace of the successful attack appears when/view.php, which is for browsing the article, is accessed afterwards. Here, the trace of the attack is a trail of execution of the attack code, and in the case of "union select version( )--", which is an SQL injection, for example, the version information (character string such as 10.0.3-MariaDB) of the DB leaks.

The determination device 10 of the first embodiment sets, as the examination target, not only the responses (1) and (3) corresponding to the request (1) and the request (3) but also the responses (2) and (4) corresponding to the request (2) and the request (4), and hence even if a trace of an attack appears in a response different from the response corresponding to the attack request, it is possible to appropriately determine the success or failure of the attack.

Next, the effect of the determination device of the first embodiment on the attack of Blind command injection will be explained with reference to FIG. 9. This attack is an attack technique that can be used even if the output is restricted by the specifications of the application when there is vulnerability that allows an arbitrary command/code to be executed. For example, when the attack of the request (1) illustrated in FIG. 9 is performed, ";cat/etc/passwd", which is an attack code portion inserted by the attacker, is executed, and the contents of an unintended file (/etc/passwd) leak.

However, since the output is limited depending on the specifications of the application, there is a case where the contents of the file cannot be output with the attack code described above. Therefore, as illustrated in the request (1), the attacker can leak the execution result of the attack code by writing, as a file, the contents of the file in a publicly disclosed directory, and then directly accessing the file (e.g., see Reference).

Reference: Commix: Detecting & Exploiting Command Injection Flaws.

https://www.blackhat.com/docs/eu-15/materials/eu-15-Stasinopoulos-Commix-Detecting-And-Exploiting-Command-Injection-Flaws.pdf In such attack, it is the request (1) in which the attack code is included, but the contents of the file/etc/passwd, which is a trace of the successful attack, appear in the response (2). Since the determination device 10 of the first embodiment sets, as the examination target, not only the response (1) corresponding to the request (1) but also the response (2) corresponding to the request (2), even if a trace of the attack appears in a response different from the response corresponding to the attack request, it is possible to appropriately determine the success or failure of the attack.

Next, the effect of the determination device of the first embodiment on the attack of Command execution via File Upload will be explained with reference to FIG. 10. This attack technique is to abuse the function of being capable of uploading files. For example, applications that manage contents such as blogs have a function of uploading files only to media such as images, but there is a case where vulnerability in the implementation allows files executable on a server such as PHP also to be uploaded.

For example, in the request (1) illustrated in FIG. 10, the file exploit.jpg.php containing the attack code "<?php system("cat/etc/passwd")?>" is uploaded via /upload.php. If it is known that the uploaded file is saved in a directory called/uploadfile, it is possible to execute the attack code by accessing as in the request (2) presented below. In this attack, as presented below, it is the request (1) in which the attack code is included, but the contents of the file/etc/passwd, which is a trace of the successful attack, appear in the response (2).

Since the determination device 10 of the first embodiment sets, as the examination target, not only the response (1) corresponding to the request (1) but also the response (2) corresponding to the request (2), even if a trace of the attack appears in a response different from the response corresponding to the attack request, it is possible to appropriately determine the success or failure of the attack.

Second Embodiment

In the determination device 10 of the first embodiment described above, the examination target is narrowed down by providing a restriction by the source IP address, but some attackers may access using an IP address different for each request, resulting in examination omission. Therefore, elimination of the restriction on the source IP address allows the examination omission to be reduced, but the number of examination targets becomes large, which affects the processing performance.

Therefore, the examination target may also be narrowed down by providing individual restrictions in accordance with the attack technique. For example, in attack techniques using Second order SQL Injection and Stored XSS, a rule of the relationship between input and output is made in advance on the basis of the contents of the request/response, and the examination target is narrowed down by providing the URL of the request with the rule which becomes restriction. The determination device 10 in this case will be explained as a determination device 10a of the second embodiment. The same components as those of the above-described embodiments are denoted by the same reference numerals and explanations thereof are omitted.

Figure 11:
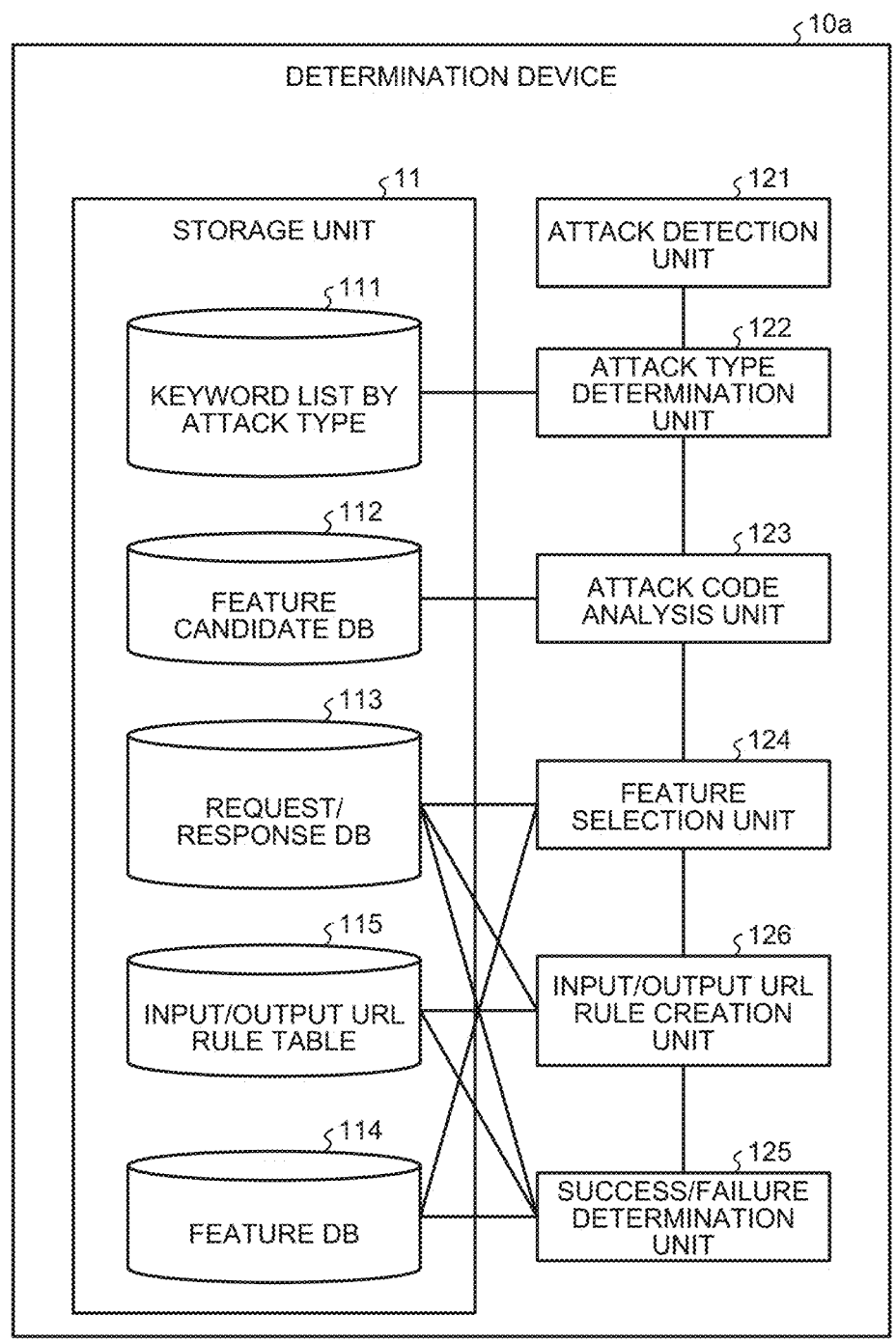
FIG. 11 is a view illustrating a configuration example of the determination device of a second embodiment.

The configuration of the determination device 10a of the second embodiment will be explained with reference to FIG. 11. As illustrated in FIG. 11, the determination device 10a of the second embodiment is different from the determination device 10 of the first embodiment in that the determination device 10a includes an input/output URL rule table 115 and an input/output URL rule creation unit 126.

The input/output URL rule table 115 is a table that defines a set of an input URL and an output URL as an input/output URL rule for searching an examination target request.

The input/output URL rule creation unit 126 sets, as an input URL, a URL path portion of a request including a predetermined keyword, sets, as an output URL, a URL path portion of a request corresponding to a response including a predetermined keyword from past requests and responses, and creates a set of the input URL and the output URL as an input/output URL rule for searching an examination target request.

That is, on the basis of past requests and responses, the input/output URL rule creation unit 126 creates a rule for the URL for receiving an input from the user and the URL for processing and outputting the input. A specific processing example of the input/output URL rule creation unit 126 will be explained below.

First, the input/output URL rule creation unit 126 extracts a parameter value from the request URL, and determines whether the input is a character string that becomes a keyword. The character string that becomes a keyword is a character string that is a unique expression from which the general output of the application and the universal expression as HTML are excluded. For example, in the example of FIG. 12, 1, 2, and 3 of the id parameters are general expressions, meanwhile 1234abcd and 5678wxyz of content are keywords.

Then, if a response including the keyword exists, the input/output URL rule creation unit 126 sets the URL path portion of the request including the keyword as the input URL. The URL path portion of the request for the response including the keyword is set as the output URL. For example, in the example of FIG. 12, the input URL is /edit.php and the output URL is /view.php.

The input/output URL rule creation unit 126 aggregates the correspondence between the input URL and the output URL described above as one tuple (input URL, output URL), and if the number of appearance of the tuple is equal to or greater than a threshold value N, the input/output URL rule creation unit 126 stores the correspondence in the input/output URL rule table 115. For example, as illustrated in the example of FIG. 13, the input/output URL rule table 115 stores a set of the input URL and the output URL stored by the input/output URL rule creation unit 126.

If a URL path portion of the attack request coincides with an input URL of the input/output URL rule, the success/failure determination unit 125 examines whether a response corresponding to a request coinciding with an output URL corresponding to the input URL among requests to the web server after the attack request has the extracted feature, and if the response has the extracted feature, the success/failure determination unit 125 determines that the attack by the attack code has succeeded.

Specifically, the success/failure determination unit 125 examines whether the URL path of the attack request exists in the input URL of the input/output URL rule table 115. Then, if the URL path of the attack request exists, the success/failure determination unit 125 sets, as the examination target, only the response of the URL path of the request coinciding with the output URL corresponding to the input URL. For example, in the case of the input/output URL rule illustrated in FIG. 13, if the URL path of the attack request is /edit.php, only the response of the request whose request URL path is /view.php is to be examined.

In the example of FIG. 14, since the attack by the request 1 coincides with the attack trace in the response 3, it is determined that the attack has succeeded. It is to be noted that in this example, it is assumed that the input/output URL rule table 115 illustrated in FIG. 13 is used. As illustrated in FIG. 14, in the determination device 10 of the first embodiment, the source IP address of the request 3 is different from that of the request 1, and thus the request 3 is not the examination target and detection omission occurs, meanwhile in the determination device 10a of the second embodiment, the response of the request whose request URL path becomes /view.php is examined, and thus the request 3 becomes an examination target, and it is possible to correctly determine that the attack has succeeded.

In this manner, in the determination device 10a of the second embodiment, even if the source IP address of the attack request changes, an attack whose input/output of the attack becomes different URL can also be set as an examination target, and it is possible to reduce detection omission.

Third Embodiment

While the determination device 10a of the second embodiment described above narrows down the examination target by focusing on the URL of the input/output, the determination device 10a of the second embodiment cannot cope with Blind command injection and Command execution via File Upload because the URL does not change with the input/output. However, since these attack techniques are via files, it is possible to narrow down the examination target by comparing the file name to be created with the URL of the request. The determination device 10 in this case will be explained as a determination device 10b of the third embodiment. The same components as those of the above-described embodiments are denoted by the same reference numerals and explanations thereof are omitted.

Figure 15:
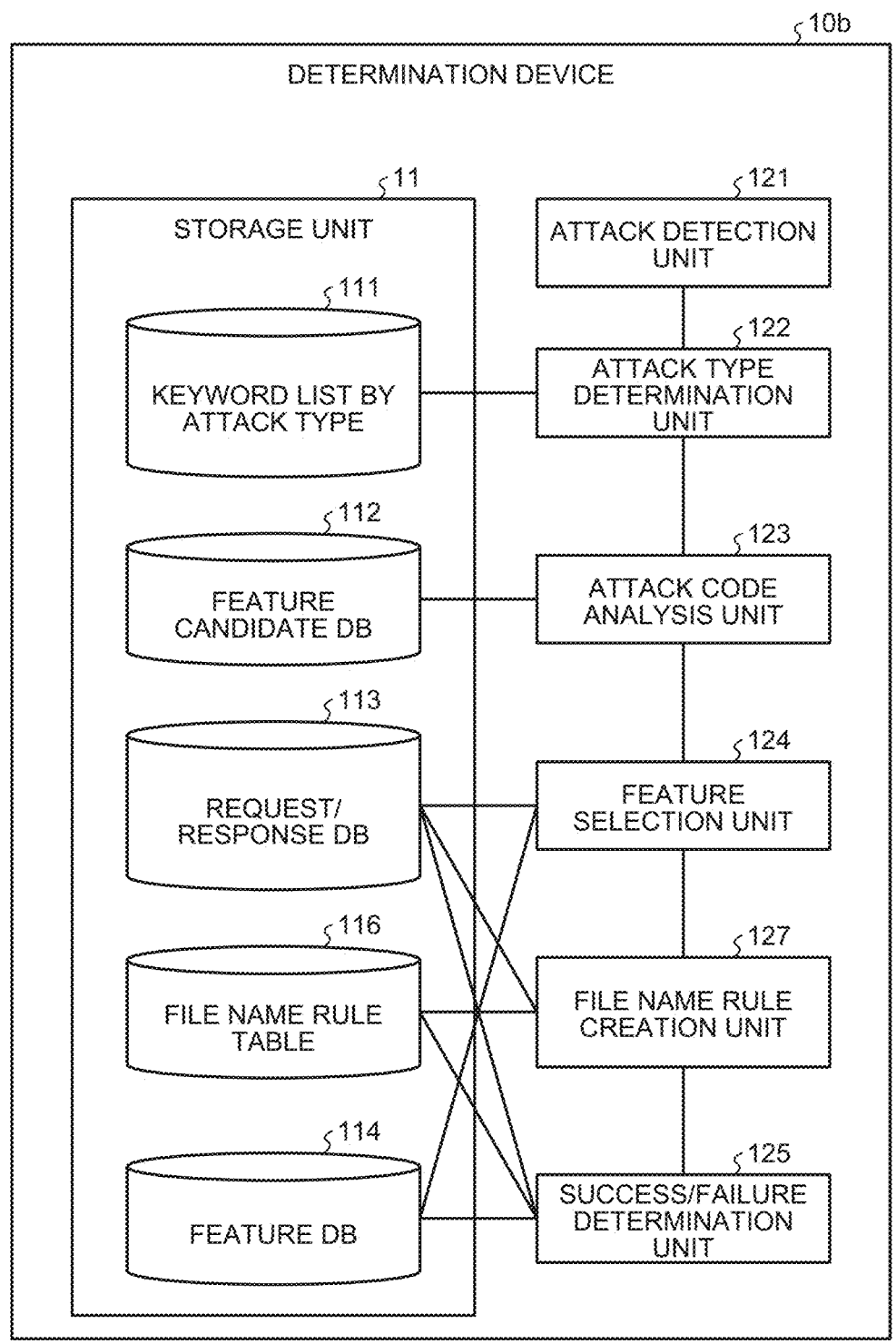
FIG. 15 is a view illustrating a configuration example of the determination device of a third embodiment.

The configuration of the determination device 10b of the third embodiment will be explained with reference to FIG. 15. As illustrated in FIG. 15, the determination device 10b of the third embodiment is different from the determination device 10a of the second embodiment in that the determination device 10b includes a file name rule table 116 and a file name rule creation unit 127.

The file name rule table 116 is a table that defines a file name created from an attack code as a file name rule for searching an examination target request.

The file name rule creation unit 127 extracts the file name created from the attack code, creates the extracted file name as a file name rule for searching an examination target request, and stores it into the file name rule table 116.

Figure 16:
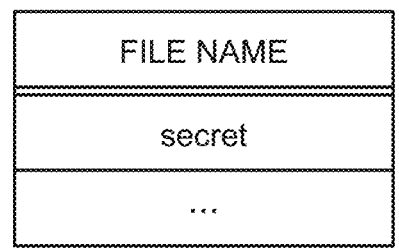
FIG. 16 is a view explaining processing of creating a file name rule table by the determination device of the third embodiment.

For example, in the case of Blind command injection, the attacker creates a file using the redirect function of the OS or the like, and hence the file name following the expression of the redirect is extracted. For example, if the attack code is "cat/etc/passwd>/var/www/secret", the expression of the redirect is ">" and the subsequent file name is secret, and hence the file name rule creation unit 127 saves secret into the file name rule table 116 as illustrated in FIG. 16.

For example, in the case of Command execution via File Upload, the request method of file upload is POST and the expression such as "Content-Type: multipart/form-data; boundary=----" appears in the header, and hence it can be discriminated from the content of the request. Then, since the file is saved in a parameter such as filename, the file name to be uploaded can be discriminated by extracting the value. Then, the file name rule creation unit 127 saves the extracted file into the file name rule table 116.

The success/failure determination unit 125 examines whether a response corresponding to a request including a file name of the file name rule among requests to the web server after the attack request has the extracted feature, and if the response has the extracted feature, the success/failure determination unit 125 determines that the attack by the attack code has succeeded. That is, the success/failure determination unit 125 searches the file name rule table 116 for the URL of the request, and only if the URL exists, the response of the request is set as an examination target.

FIG. 17 is an example in which it is determined that an attack has succeeded because the attack by the request 1 coincides with the attack trace with the response 3. It is assumed that secret is saved as a file name rule in the file name rule table 116 as described above. In the determination device 10 of the first embodiment, the source IP address of the request 3 is different from that of the request 1, and thus the request 3 is not the examination target and detection omission occurs, meanwhile in the determination device 10b of the third embodiment, the URL of the request 3 includes secret and the request 3 becomes the examination target, and hence it is possible to correctly determine that the attack has succeeded.

In this manner, even if the source IP address of the attack request changes, the determination device 10b of the third embodiment can also set, as the examination target, an attack whose output of the attack code is carried out via a file, and it is possible to reduce detection omission.

Other Embodiments

It is to be noted that the attack detection unit 121 of the determination device 10, 10a, or 10b described in the respective embodiments may be installed outside the determination device 10. For example, as illustrated in FIGS. 18 (a) and (b), the attack detection unit 121 may be realized by an attack detection device such as a WAF installed outside the determination device 10, 10a, or 10b. The determination device 10, 10a, or 10b may have a configuration (inline configuration) of being directly connected with the web server that becomes a determination target of the success/failure of an attack as illustrated in FIG. 18 (a), or may have a configuration (tap configuration) of being connected with the web server via the attack detection device such as the WAF as illustrated in FIG. 18 (b).

[System Configuration and so On]

Each component of each device illustrated in the drawings is functionally conceptual, and does not necessarily have to be physically configured as illustrated in the drawings. That is, the specific form of the distribution/integration of each device is not limited to that illustrated in the drawings, and it is possible to configure all or part thereof by functionally or physically distributing/integrating in arbitrary units in accordance with various loads, usage conditions, and the like. Furthermore, all or any part of each processing function performed in each device can be realized by the CPU and a program analyzed and executed by the CPU, or can be realized as hardware by the wired logic.

Of each processing explained in the present embodiment, all or part of the processing explained as being automatically performed can be manually performed, or all or part of the processing explained as being manually performed can be automatically performed by a publicly known method. Besides, the processing procedures, the control procedures, the specific names, and the information including various data and parameters presented in the above-mentioned document and the drawings can be arbitrarily changed unless otherwise specified.

[Program]

A program that realizes the function of the determination device 10 described in the above embodiment can be implemented by installing the program into a desired information processing device (computer). It is possible to cause the information processing device to function as the determination device 10 by causing the information processing device to execute the program described above provided as package software or online software, for example. The information processing device mentioned here includes a personal computer of a desktop type or a laptop type. Besides, the scope of the information processing device includes mobile communication terminals such as a smartphone, a mobile phone, and a personal handyphone system (PHS), and personal digital assistants (PDA). The determination device 10 may be implemented on a cloud server.

Figure 19:
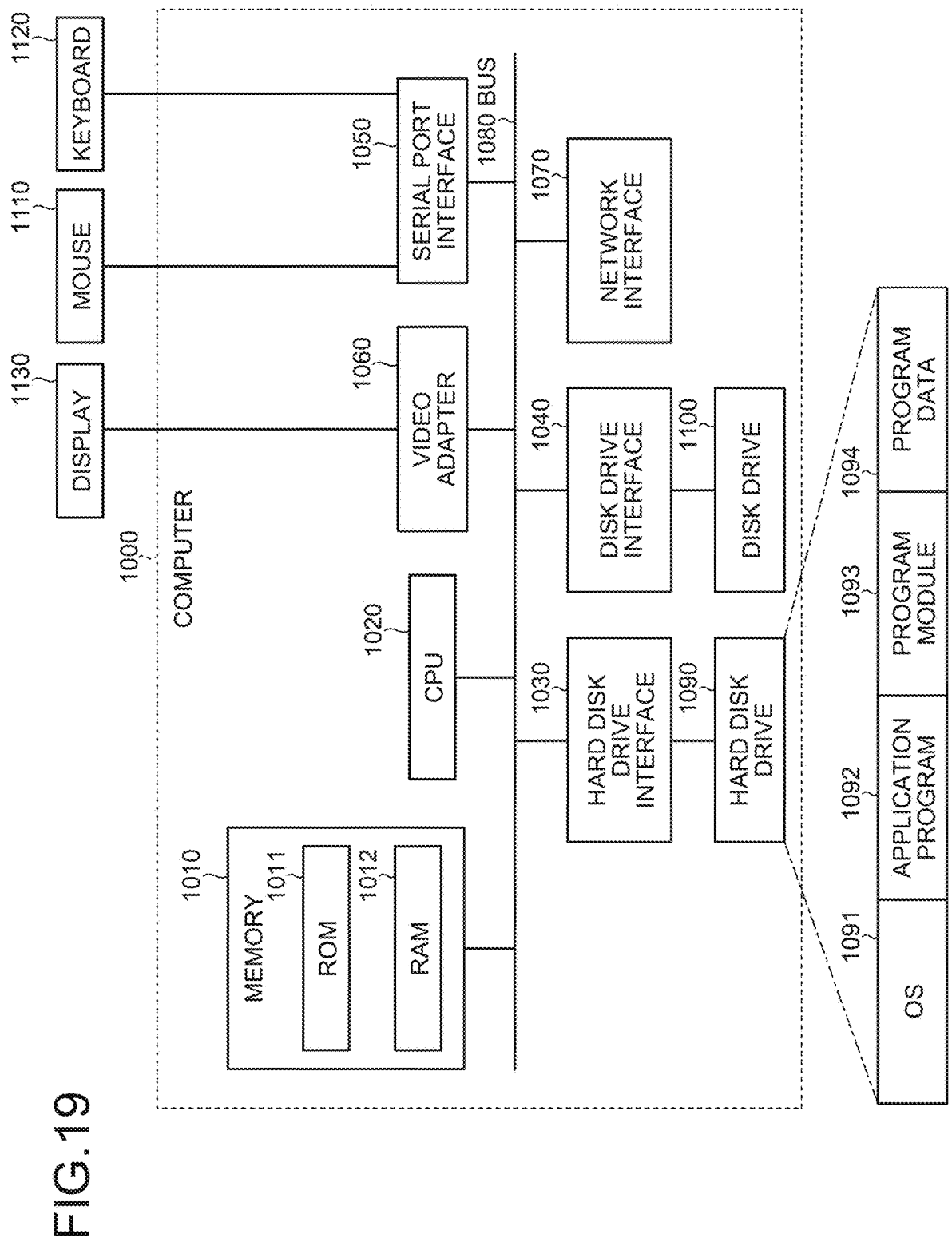
FIG. 19 is a view illustrating a computer that executes a determination program.

An example of a computer that executes the program (determination program) described above will be explained with reference to FIG. 19. As illustrated in FIG. 19, a computer 1000 has, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012. The ROM 1011 stores a boot program such as a basic input output system (BIOS). The hard disk drive interface 1030 is connected to a hard disk drive 1090. The disk drive interface 1040 is connected to a disk drive 1100. A removable storage medium such as a magnetic disk or an optical disk is inserted into the disk drive 1100. For example, a mouse 1110 and a keyboard 1120 are connected to the serial port interface 1050. A display 1130, for example, is connected to the video adapter 1060.

Here, as illustrated in FIG. 19, the hard disk drive 1090 stores, for example, an OS 1091, an application program 1092, a program module 1093, and program data 1094.

Various data and information explained in the above embodiments are stored in, for example, the hard disk drive 1090 or the memory 1010.

Then, the CPU 1020 reads the program module 1093 and the program data 1094 stored in the hard disk drive 1090 to the RAM 1012 as necessary, and executes each procedure described above.

It is to be noted that the program module 1093 and the program data 1094 related to the determination program described above are not limited to the case of being stored in the hard disk drive 1090, and they may be stored in a removable storage medium, for example, and read by the CPU 1020 via the disk drive 1100 or the like. Alternatively, the program module 1093 and the program data 1094 related to the program above may be stored in another computer connected via a network such as a local area network (LAN) or a wide area network (WAN), and read by the CPU 1020 via the network interface 1070.

REFERENCE SIGNS LIST

10 DETERMINATION DEVICE
11 STORAGE UNIT
111 KEYWORD LIST BY ATTACK TYPE
112 FEATURE CANDIDATE DB
113 REQUEST/RESPONSE DB
114 FEATURE DB
115 INPUT/OUTPUT URL RULE TABLE
116 FILE NAME RULE TABLE
121 ATTACK DETECTION UNIT
122 ATTACK TYPE DETERMINATION UNIT
123 ATTACK CODE ANALYSIS UNIT
124 FEATURE SELECTION UNIT
125 SUCCESS/FAILURE DETERMINATION UNIT
126 INPUT/OUTPUT URL RULE CREATION UNIT
127 FILE NAME RULE CREATION UNIT

The invention claimed is:

1. A determination method comprising:
    determining an attack type of an attack code included in an attack request on a server;
    carrying out emulation of an attack by the attack code on the server in accordance with the determined attack type, and in a case of succeeding in an attack on the server as a result of the emulation, extracting a feature appearing in a response from the server; and
    examining whether a plurality of responses respectively corresponding to a plurality of requests to the server after the attack request each have the extracted feature, and in a case where at least any one of the plurality of responses has the extracted feature, determining that an attack by the attack code has succeeded, by a processor.

2. The determination method according to claim 1, wherein the examining includes examining whether a plurality of responses respectively corresponding to a plurality of requests transmitted to the server within a predetermined amount of time from the attack request each have the extracted feature, and in a case where at least any one of the plurality of responses has the extracted feature, determining that an attack by the attack code has succeeded.

3. The determination method according to claim 1, wherein the examining includes examining whether a plurality of responses respectively corresponding to a plurality of requests to the server after the attack request, the requests having the same source IP address as that of the attack request, each have the extracted feature, and in a case where at least any one of the plurality of responses has the extracted feature, determining that an attack by the attack code has succeeded.

4. The determination method according to claim 1, further including:
- setting, as an input URL, a URL path portion of a request including a predetermined keyword, setting, as an output URL, a URL path portion of a request corresponding to a response including a predetermined keyword from past requests and responses, and creating a set of the input URL and the output URL as an input/output URL rule for searching an examination target request, wherein
- the examining includes examining, in a case where a URL path portion of the attack request coincides with an input URL of the input/output URL rule, whether a response corresponding to a request coinciding with an output URL corresponding to the input URL among requests to the server after the attack request has the extracted feature, and when the response has the extracted feature, to determine that an attack by the attack code has succeeded.

5. The determination method according to claim 1, further including:
- extracting a file name created from the attack code, and creating the extracted file name as a file name rule for searching an examination target request, wherein
- the examining includes examining whether a response corresponding to a request including a file name of the file name rule among requests to the server after the attack request has the extracted feature, and when the response has the extracted feature, to determine that an attack by the attack code has succeeded.

6. A determination device comprising:
a memory; and
processing circuitry coupled to the memory and configured to:
- determine an attack type of an attack code included in an attack request on a server,
- carry out emulation of an attack by the attack code on the server in accordance with the determined attack type, and in a case of succeeding in an attack on the server as a result of the emulation, extract a feature appearing in a response from the server, and
- examine whether a plurality of responses respectively corresponding to a plurality of requests to the server after the attack request each have the extracted feature, and in a case where at least any one of the plurality of responses has the extracted feature, determine that an attack by the attack code has succeeded.

7. A non-transitory computer-readable recording medium storing therein a determination program that causes a computer to execute a process comprising:
- determining an attack type of an attack code included in an attack request on a server,
- carrying out emulation of an attack by the attack code on the server in accordance with the determined attack type, and in a case of succeeding in an attack on the server as a result of the emulation, extracting a feature appearing in a response from the server, and
- examining whether a plurality of responses respectively corresponding to a plurality of requests to the server after the attack request each have the extracted feature, and in a case where at least any one of the plurality of responses has the extracted feature, determining that an attack by the attack code has succeeded.

* * * * *